Oct. 27, 1925.
A. E. BAUMAN
TIRE CORE
Filed Sept. 27, 1922
1,558,455
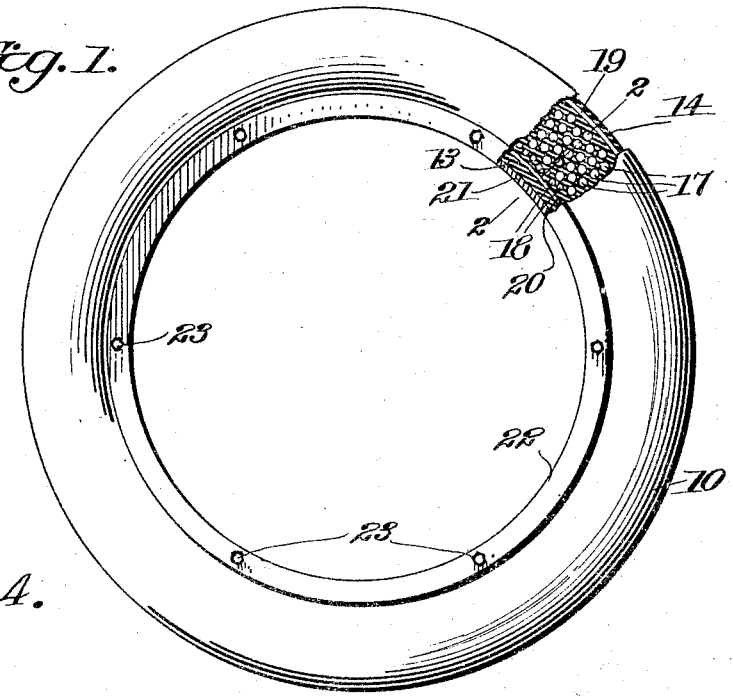
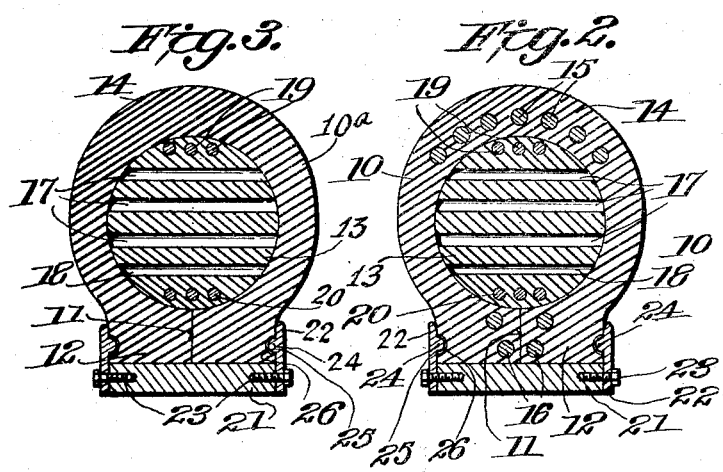
INVENTOR,
Arthur E. Bauman,
ATTORNEY.

Patented Oct. 27, 1925.

1,558,455

UNITED STATES PATENT OFFICE.

ARTHUR E. BAUMAN, OF AKRON, OHIO.

TIRE CORE.

Application filed September 27, 1922. Serial No. 590,907.

*To all whom it may concern:*

Be it known that I, ARTHUR E. BAUMAN, a citizen of the United States, residing at Akron, in the county of Summit and State of Ohio, have invented certain new and useful Improvements in Tire Cores, of which the following is a specification.

This invention relates to a resilient tire.

It is generally aimed to provide a construction which eliminates the use of a pneumatic tube and yet possesses the desirable riding qualities thereof without the disadvantages of such a tube.

Another object is to produce a tire having a cushion core or filler in lieu of the pneumatic tube, and which may be a rubber body, suitably perforated and having resilient rings embedded therein to increase its resiliency and riding qualities.

I also aim to construct a tire in which the casing may have suitable resilient rings embedded therein, relatively close together, and either or both at the tread and the heel or securing portion to increase the resiliency and riding qualities thereof.

Various additional objects and advantages will appear from the description following taken in connection with accompanying drawings illustrating an operative embodiment thereof.

In said drawings:—

Figure 1 is a side elevation, partly broken away, of a tire embodying the invention and mounted on a retaining rim;

Figure 2 is a cross-sectional view on the line 2—2 of Figure 1;

Figure 3 is a cross-section taken on the same plane as Figure 2 but through a modified form; and Figure 4 is a cross section through a modified form of ring which may be employed.

Like reference characters designate like or similar parts in the different views.

In said drawings, particularly Figures 1 and 2, a tire is shown consisting of an outer shoe or casing 10 of any suitable construction, the body of which is principally of rubber, reinforced if desired by cords or fabric in accordance with the usual practice. Casing 10 is slit as at 11 intermediate heels 12 to facilitate separation of said heels for insertion or removal of an annular core or filler 13 in place of the usual pneumatic inner tube.

Embedded in the body of casing 10 across the tread portion 14 thereof are a plurality of relatively close annular rings 15 preferably of resilient metal. Said rings 15 may be of any desired number and extend for any approved distance in a row transversely of the tire as well as circumferentially. Rings 15 are separated as shown so as to facilitate compression or lateral expansion of the tire.

In each heel 12, one or more resilient metallic annular rings 16 may be embedded to reinforce the casing.

The core or filler 13 is removably disposed in casing 10 and its body may be round in cross section as shown and of rubber alone, of rubber composition, or reinforced by fabric or the equivalent. Preferably the core is of a rubber or material more elastic and yielding than the casing 10. Arranged transversely of and completely through said core 13 are multitudinous holes or passages 17 and 18, the latter being smaller than the former and all serving to increase the resiliency of the core. Annular resilient metallic rings 19 and 20 are embedded in the core to increase its resiliency adjacent the outer portion and inner portion thereof, respectively, being in pluralities and spaced apart as shown to facilitate compression or lateral expansion of the core or filler.

The tire may be mounted in any approved manner such as on a ring or band 21 which may be a wheel felly or adapted for demountable application to a felly. Annular fastening or side plates 22 may be removably bolted at 23 to ring 21 to complete or form a rim and the said side plates overlap the heels 12 and have interengaging connection therewith by means of ribs 24 of any suitable shape on the plates 22 entering grooves 25 in the said heels. The grooves may be protectively lined with fabric or the like as at 26 if desired.

A tire thus constructed will present easy riding qualities substantially similar to a pneumatic tire but will not be subject to puncture and blowout and their incidental objections and inconveniences.

In Figure 3, a modified form is illustrated which is similar to that of Figures 1 and 2 with the exception of the omission of rings 15 and 16 from the casing which is designated 10ª therein. The same reference characters as in said Figures 1 and 2 have been applied to Figure 3 where the parts are common to the two forms.

In lieu of being round in cross-section, the various rings 15, 16, 19 and 20 may be of any approved shape, for instance elliptical as in Figure 4.

Other changes in the details, combinations and arrangement of the parts may be resorted to within the spirit and scope of the invention.

I claim:—

1. A tire having a yieldable core, said core being provided with a plurality of rows of laterally disposed rings extending circumferentially about the same, and the core having spaces intermediate said rows.

2. A tire having an elastic core, said core being provided with a plurality of rows of laterally disposed resilient rings extending circumferentially about the same, and the core being transversely perforated intermediate said rows.

In testimony whereof I hereby affix my signature.

ARTHUR E. BAUMAN.